Figure 1:
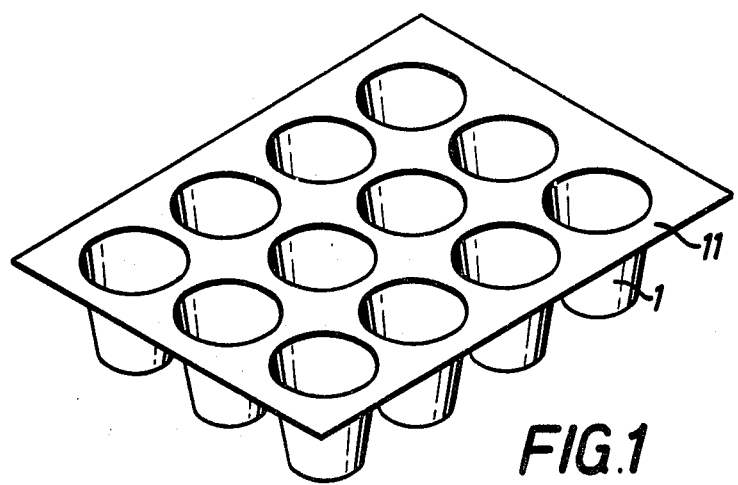

United States Patent [19]

Brümmer

[11] 4,151,032
[45] Apr. 24, 1979

[54] APPARATUS AND METHOD FOR MANUFACTURING A PLASTIC CONTAINER HAVING PRINTED PAPER INSERT

[75] Inventor: Friedrich Brümmer, Dinkelsbühl, Fed. Rep. of Germany

[73] Assignee: ESBE Plastics Dinkelsbuhl Brümmer K.G., Fed. Rep. of Germany

[21] Appl. No.: 841,377

[22] Filed: Oct. 12, 1977

[30] Foreign Application Priority Data

Oct. 20, 1976 [DE] Fed. Rep. of Germany ....... 2647238

[51] Int. Cl.² .......................................... B65C 3/08
[52] U.S. Cl. .................................... 156/215; 156/218; 156/293; 156/481; 156/214
[58] Field of Search ............... 156/212, 214, 215, 217, 156/218, 475, 477 R, 481, DIG. 12, DIG. 27, DIG. 31, DIG. 37, 293, 481; 206/457, 45.33

[56] References Cited

U.S. PATENT DOCUMENTS

| | | | |
|---|---|---|---|
| 2,124,670 | 7/1938 | Johnson | 156/212 |
| 2,554,722 | 5/1951 | Waters | 156/214 |
| 2,848,228 | 8/1958 | Kimbro | 156/DIG. 31 |
| 3,813,272 | 5/1974 | Straughan | 156/212 |

Primary Examiner—John T. Goolkasian
Assistant Examiner—William H. Thrower
Attorney, Agent, or Firm—Schiller & Pandiscio

[57] ABSTRACT

The invention provides a method and apparatus for manufacturing rounded containers having inner and outer mating wall parts of plastics with a printed paper segment between said parts. The method comprises locating an outer wall part at a paper insert station in alignment with the smaller open end of a tubular tapered guide, feeding a printed paper segment through the tapered guide, where it is progressively shaped to correspond with the container but is given slightly smaller dimensions, and into said outer wall part, whereupon the resilience of the segment due to bending causes it to expand into contact with the interior of said outer wall part. An inner wall part is pressed into the outer wall at a subsequent operating station.

The apparatus is arranged specifically to effect the above method.

4 Claims, 3 Drawing Figures

APPARATUS AND METHOD FOR MANUFACTURING A PLASTIC CONTAINER HAVING PRINTED PAPER INSERT

Rounded containers are frequently used for packaging foodstuffs such as yoghurt, cottage cheese, margarine, lard, icecream, etc. Dominating the market there are containers made of printed polystyrene and containers made of paper, perhaps with a suitable coating of sheet plastic. In the case of paper containers, these may be either impregnated or laminated in order to acquire the necessary characteristics demanded by the contents.

By rounded is meant any container shape which, in plan, is continuously curved (e.g. circular or oval), or partly curved (e.g. square or rectangular with rounded corners).

The techniques available for printing on paper are more varied, and they are also easier to carry out than on plastics. However, lamination of the paper with appropriate plastic sheeting has the disadvantage that many working processes have to be taken into account, such as for example, the separate fabrication of a base and side wall for the container, and a strengthening rim around the edge of the side wall. With all of these working processes the possibility of rejects occuring is increased. Plastic containers, either injection moulded or heat-formed, can reproduce exactly all of the necessary features required, such as stacking spacers or rims, and also the appropriate formation of the base and side wall in one operation. However, the techniques available for printing onto these plastic containers are relatively costly because the plastic surface compared with a paper surface is much more difficult to print on.

An object of the invention is to provide a method and apparatus for producing a container which combines the advantages of printing on paper with the advantages forming in plastic.

According to one aspect of this invention, there is provided a method of manufacturing a rounded container of the kind having inner and outer mating container wall part of plastics with a printed paper segment interposed between said parts, comprising the steps of locating an outer container part at a paper insert station in alignment with the smaller open end of a tubular tapered guide, said smaller open end being of similar shape, but smaller dimension than the mouth of the outer container part, feeding a said printed paper segment into the tapered guide and causing it to be moved along said guide whereby the segment is progressively shaped to correspond with the container, and causing the shaped insert to be fed through said smaller open end and into the outer container part, whereupon its resilience causes it to expand into contact with the inner surface of the side wall of the outer container part, and subsequently pressing an inner container part into the outer container part to trap the paper insert therebetween.

According to a second aspect of this invention, there is provided apparatus for manufacturing a rounded container of the kind referred to in the first aspect comprising means for feeding an outer container part to a paper insert station, a tubular tapered guide, the smaller open end of which is in alignment with said insert station, a suction device which is movable along the axis of said guide, means for feeding paper segments towards said suction device, and means for locating an inner container part into the outer container part, the arrangement being such that at the paper insert station, the suction device an be actuated to move from a retracted position into and through the tubular guide and to carry with it a paper segment which is progressively shaped by the guide and fed into the outer container part.

Figure 2:
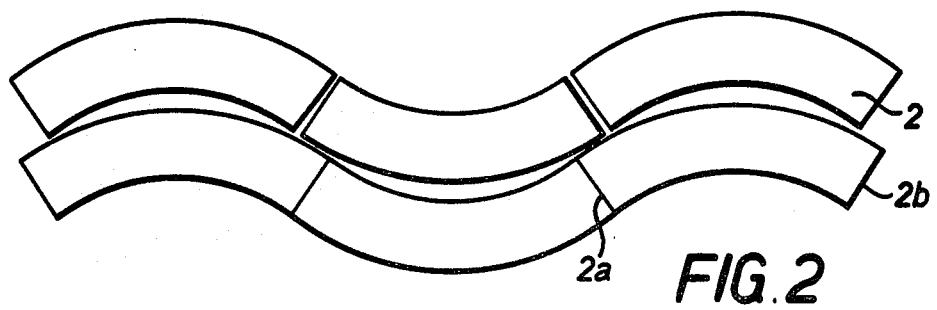
Figure 3:
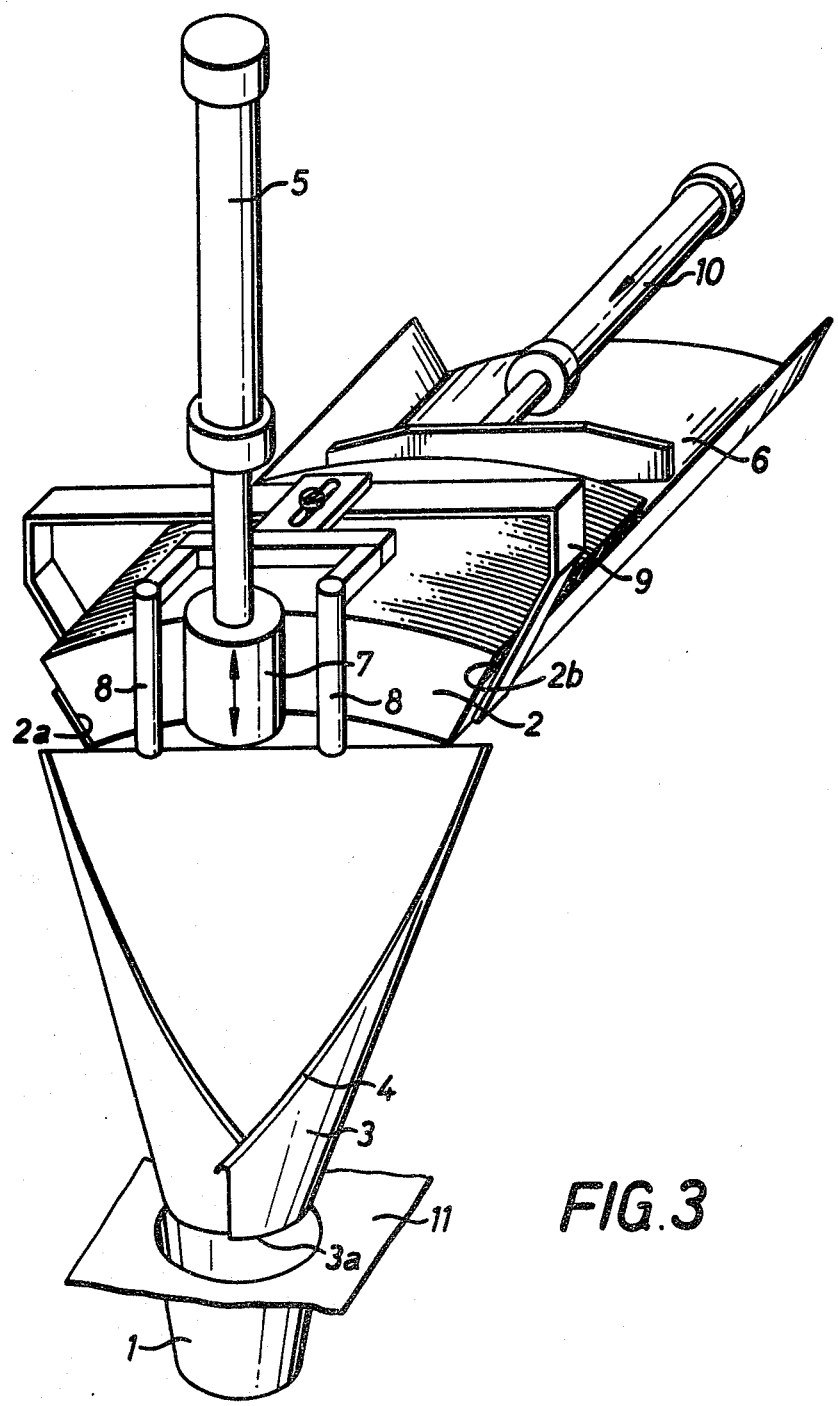

In order that the invention will be readily understood, one embodiment thereof, for manufacturing round pots particularly for yoghurt will now be described with reference to the accompanying drawings in which:

FIG. 1 is a perspective view of a forming comprising a number of outer container parts, FIG. 2 is a view of a number of paper segments, and FIG. 3 is a perspective view of one feeding device for inserting a paper insert into an outer container part.

Referring particularly to FIG. 3, an outer container part 1 is fed to a paper insert station immediately beneath the paper insert guide which is in the form of a tapered funnel 3. The funnel 3 comprises a bent metal sheet which provides a circular smaller open end 3a which is of slightly smaller diameter than the mouth of the outer container part 1. In this embodiment part of the side wall of the funnel provides a generally V-shaped opening, defined by a lip 4 along two edges of the metal sheet; this opening provides for access by the operator for service should this be necessary. Immediately above the funnel 3, a feeding mechanism is located comprising a circular suction plug 7 which can be actuated via a compressed air cylinder 5 to traverse in a vertical direction along the axis of the funnel 3 in either direction as required. The paper segments 2 are stacked together and then laid into a suitable groove or chute 6 which is arranged to guide the inserts in a horizontal direction towards the plug 7. A pair of stop bars 8 are suspended from a bracket 9 to set the operating position for the paper segments 2 and a further compressed air cylinder arrangement 10 is provided biassing for the stack of paper segments 2 so as to bring the first segment of the stack into contact with the stop bars 8 and plug 7.

In operation, assuming an outer container part 1 to be located at the paper insert station and the plug 7 to be in a retracted position as shown in FIG. 3, suction is applied to the plug 7 so as to cause the first paper segment 2 of the stack to adhere thereto. The cylinder 5 is then actuated to move the plug carrying said first paper segment into and through the funnel 3. The paper segment is thereby progressively bent into shape and is passed through the open end 3a of the funnel into the outer container part 1. Suction to the plug 7 is then released, whereupon the resilience of the paper segment causes it to open out and into contact with the inner surface of the side wall of the container part 1. Also, the cylinder 5 is actuated to return the plug 7 to its retracted position ready for another cycle on the next following container part 1 fed to the insert station. It will be appreciated that because the paper segment opens out to a larger diameter than the funnel end 3a, said segment cannot be drawn back by the plug 7 during its return movement. Subsequently, the container part 1 complete with its paper segment 2 is fed to another station where the inner container part is pressed into the outer container part 1. The rims of the outer and inner container parts are preferably formed with mating ribs or the like so as to lock them together.

Referring to FIG. 1, the outer container parts 1 may be pre-formed, for example, by vacuum forming, as trays 11. In FIG. 1, 12 container parts are formed in each tray, there being 3 rows of 4 said parts. In this case, three aligned feeding devices as shown in FIG. 3 may be provided, spaced apart to coincide with the spacing of the rows, the tray then being indexed forward through the insert stations. Alternatively, a grid of 12 feeding devices may be provided spaced so as to coincide with the spacing of all the parts 1 formed in the tray. In either case, after inserting all the paper segments 2, the tray would be moved to a further station to receive in pressing engagement therewith a similar tray of inner container parts; thereafter the pressed-together trays would be passed to a stamping station for a cutter to stamp out the finished pots from the tray.

Referring to FIG. 2, the pre-printed paper segments 2 are shaped and dimentioned so as to substantially cover the side walls of the pots and their opposite edges 2a and 2b in abutting relationship to afford protection against light for the intended contents of the pot.

In a modification, the funnel 3 can be shaped so as to deform the edges 2a and 2b of the segments more strongly thereby to avoid non-circularity or angular bulging of the finished pots. Shaping of the segment may be enhanced by a strip heater extending along the lip 4 of the funnel for heating the surface of the latter.

I claim:

1. A method of manufacturing a rounded container of the kind having inner and outer mating container wall parts of plastics with a printed paper segment interposed between said parts, comprising the steps of locating an outer container part at a paper insert station in alignment with the smaller open end of a tubular tapered guide, said smaller open end being of similar shape but smaller dimension than the mouth of the outer container part, feeding a said printed paper segment into the tapered guide and causing it to be moved along said guide whereby the segment is progressively shaped to correspond with the container, and causing the shaped insert to be fed through said smaller open end and into the outer container part, whereupon its resilience causes it to expand into contact with the inner surface of the side wall of the outer container part, and subsequently pressing an inner container part into the outer container part to sandwich the paper insert therebetween.

2. A method according to claim 1, wherein a tray comprising a plurality of rows of outer container parts in spaced relationship are fed to said insert station, at which are arranged one or more rows of correspondingly spaced tubular tapered guides whereby a number of paper segments can simultaneously be fed into said outer container parts, and wherein, after all of said outer container parts are provided with paper segments, said tray is moved to a further station to receive in pressing engagement a similar tray of inner container parts, the pressed trays being subsequently passed to a stamping station where the formed containers are stamped out.

3. Apparatus for manufacturing a rounded container of the kind having inner and outer container wall parts of plastics with a printed paper segment interposed between said parts, comprising means for feeding an outer container part to a paper insert station, a tubular tapered guide, the smaller open end of which is in alignment with said insert station, a suction device which is movable along the axis of said guide, means for feeding paper segments towards said suction device, and means for locating an inner container part into the outer container part, the arrangement being such that, at the paper insert station, the suction device can be actuated to move from a retracted position into and through the tubular guide and to carry with it a paper segment which is progressively shaped by the guide and fed into the outer container part.

4. Apparatus according to claim 3, wherein the tapered tubular guide comprises a funnel arranged with its axis vertical, the insert station is located beneath said smaller open end, said means for feeding the paper segments comprises a chute and biassing means to urge a stack of said segments into contact with the suction device which is in the form of a plug, the arrangement being such that continued feeding movement of the suction plug carries the paper segments one at a time into and through said funnel.

* * * * *